United States Patent [19]

Gianzero et al.

[11] Patent Number: 4,468,623

[45] Date of Patent: Aug. 28, 1984

[54] METHOD AND APPARATUS USING PAD CARRYING ELECTRODES FOR ELECTRICALLY INVESTIGATING A BOREHOLE

[75] Inventors: Stanley C. Gianzero, Austin, Tex.; David E. Palaith, New Canaan; David S. K. Chan, Bethel, both of Conn.

[73] Assignee: Schlumberger Technology Corporation, New York, N.Y.

[21] Appl. No.: 288,554

[22] Filed: Jul. 30, 1981

[51] Int. Cl.³ .............................................. G01V 3/20
[52] U.S. Cl. .................................. 324/367; 324/355; 324/374
[58] Field of Search ................ 324/347, 355, 366–375

[56] References Cited

U.S. PATENT DOCUMENTS

| | | | |
|---|---|---|---|
| 2,194,229 | 3/1940 | Johnston et al. | 324/221 X |
| 2,393,009 | 1/1946 | Chun | 324/366 |
| 2,712,629 | 7/1955 | Doll | 324/1 |
| 2,750,557 | 6/1956 | Bricaud | 324/10 |
| 2,786,178 | 3/1957 | Doll | 324/1 |
| 2,930,969 | 3/1960 | Baker | 324/10 |
| 3,065,405 | 11/1962 | Jarrett | 324/1 |
| 3,136,942 | 6/1964 | Schuster | 324/1 |
| 3,521,154 | 7/1970 | Maricelli | 324/10 |

FOREIGN PATENT DOCUMENTS 685727  1/1960  Canada .................................. 324/7

OTHER PUBLICATIONS

Article—"Reservoir Evaluation of Fractured Cretaceous Carbonates in South Texas", J. Beck, A. Schultz, D. Fitzgerald-SPWLA, Eighteenth Annual Logging Symposium, Jun. 5–8, 1977.
Article—"The High Resolution Dipmeter Tool", L. A. Allaud and J. Ringot, reprinted from The Log Analyst, May–Jun., 1969.

Primary Examiner—Gerard R. Strecker
Attorney, Agent, or Firm—Stephen L. Borst; David H. Carroll; Louis H. Reens

[57] ABSTRACT

Methods and apparatuses for electrically investigating a borehole are described. Tool mounted pads are provided, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies.

51 Claims, 9 Drawing Figures

METHOD AND APPARATUS USING PAD CARRYING ELECTRODES FOR ELECTRICALLY INVESTIGATING A BOREHOLE

FIELD OF THE INVENTION

This invention generally relates to explorations for hydrocarbons involving electrical investigations of a borehole penetrating an earth formation. More specifically, this invention relates to highly localized borehole investigations employing the introduction and measuring of individual survey currents injected toward the wall of a borehole with a tool moved along the borehole.

BACKGROUND OF THE INVENTION

Electrical earth borehole logging is well known and various devices and techniques have been described. In an electrical investigation of a borehole, current from an electrode is introduced in the formation from a tool inside the borehole. If this current is maintained constant, the voltage measured at a monitor electrode is proportional to the resistivity of the earth formation being investigated. If the current is varied to maintain constant the voltage measured at a monitor electrode, the current is inversely proportional to the resistivity of the earth formation being investigated. If both voltage and current are allowed to vary, their ratio is proportional to the resistivity of the earth formation being investigated. Substantial advances have been made in such electrical investigations by using electrodes whose currents are focused by other electrodes and thus determine the resistivity of the formation at a desired distance from the borehole wall surface. One technique and device for focused electrical investigation may be as described and shown in the U.S. Pat. Nos. 2,712,629 to Doll and 2,750,557 to Bricaud. In U.S. Pat. No. 2,712,629 pad mounted sets of electrodes are described as each formed of a central survey electrode surrounded at spaced intervals by continuous guard electrodes embedded in segmented recesses. In U.S. Pat. No. 2,750,557 the pad mounted electrodes are formed of electrically directly connected segments or buttons.

In the U.S. Pat. No. 3,521,154 to Maricelli a plurality of survey electrodes are mounted on a single pad as a composite focusing electrode, with a pair of the survey electrodes aligned along the direction of travel of the tool along the borehole and one survey electrode horizontally displaced to provide a technique for effectively improving the signal to noise ratio of the resistivity measurements.

Techniques for investigating the earth formation with larger arrays of measuring electrodes have been proposed. See, for example, the U.S. Pat. No. 2,930,969 to Baker and Canadian Pat. No. 685,727 to Mann et al. The Baker patent proposed a plurality of electrodes, each of which was formed of buttons which are electrically joined by flexible wires with buttons and wires embedded in the surface of a collapsible tube. The Canadian patent proposes an array of small electrode buttons either mounted on a tool or a pad and each of which introduces in sequence a separately measurable survey current for an electrical investigation of the earth formation. The electrode buttons are placed as shown in the Canadian patent in a horizontal plane with circumferential spacings between electrodes and a device for sequentially exciting and measuring a survey current from the electrodes is described.

A technique has been proposed in an article "Reservoir Evaluation of Fractured Cretaceous Carbonates in South Texas" by J. Beck et al, presented at the SPWLA Eighteenth Annual Logging Symposium of June 5–8, 1977 to identify fractures in the wall of a borehole using a resistivity dip meter tool. The tool employs several pads each of which has a survey electrode from which current is introduced into the borehole wall. The presence of a fracture may be identified by noting a deviation between the survey currents from different pads. Such survey current deviation may indicate a fracture by virtue, for example, of the invasion of higher conducting mud into the fracture. In one specific technique a small survey electrode is used on each of four pads to provide an indication of vertical fractures when the tool is rotated as it is moved along the borehole.

Although these known techniques provide useful information of the earth formation surrounding a borehole, their surface area coverage does not enable the detection of resistivity anomalies of sufficiently fine detail and accuracy useful in determining the presence of fractures and thin bed layers or their orientations.

SUMMARY OF THE INVENTION

With a technique for electrically investigating an earth formation in accordance with the invention, a circumferentially and axially continuous borehole surface segment is injected with individually measurable survey currents from an array of electrodes sized to be able to detect resistivity anomalies indicative of thin fractures in the earth formation as well as the stratigraphy at the borehole wall.

As described with reference to one embodiment in accordance with the invention, a tool is provided for investigating a borehole wall with a plurality of pads pressed against the borehole wall. Each pad carries an array of small measure electrodes embedded in a conductive pad surface. The electrodes are each sized as small as practical for the detection of resistivity anomalies indicative of fine fractures and stratigraphy. The measure electrodes are selectively located with respect to each other so that their combined effect, as the tool is moved along the borehole, is the injection of a spatially continuous flow of survey current into a circumferential portion of the borehole wall. The measure electrodes are so connected to a source of electrical energy that currents from them can be individually measured. As the tool is moved along the borehole, an axially continuous area of the borehole wall is examined by detecting current anomalies which may indicate the presence of bed layers, cracks or fractures in the earth formation segment in which the survey currents are injected. The measure electrodes may be arranged in a linear array or in a loop shaped array.

As described with reference to one form for a pad carrying a plurality of measure electrodes in accordance with the invention, the pad has a conductive surface in which an array of measure electrodes is embedded. The measure electrodes are electrically insulated from the conductive pad surface with thin insulators. An electrical energization of the conductive pad surface and the measure electrodes at the same potential provides electrical currents into the formation but with the survey current from each electrode being separately measurable. The measure electrodes are arranged at intervals that are selected at least along a circumferential direction so as to inject the survey currents into borehole segments which circumferentially overlap each other as the tool is moved along the borehole. As a result a circumferential portion of the borehole wall opposite the pad is injected with a circumferentially spatially contiguous flow of survey current, discrete portions of which are measurable by monitoring the magnitude of the currents from each survey electrode. With the measure electrodes being made as small as is practical, resistivity anomalies can be measured indicative of small scale features of the borehole wall. While the tool is moved along the borehole, each pad provides a detailed investigation of a different portion of the borehole wall.

The electrical survey currents generated by the respective measure electrodes are sampled at a rate sufficient to enable an accurate reproduction of the current density from the pad and thus measure resistivity anomalies of the borehole wall segment opposite to the pad on which the sampled electrodes are located. The effective circumferential spacings between measure electrodes are selected to enable such current density reproduction with a minimum of distortions.

The spacings between those measure electrodes, which can be deemed as circumferentially successive, are selected to determine the survey current density from the pad in an accurate manner. This involves, as described herein for one embodiment, a center to center spacing (as measured in the circumferential direction) between circumferentially successive electrodes of preferably no larger than a predetermined portion of the circumferential dimension of the measure electrodes. This means a circumferential overlap of a predetermined amount, or preferably at least as much as one half of such dimension. Such overlap can be accommodated by placing the measure electrodes in the array in different rows so that circumferentially successive measure electrodes are located in different rows. In the case of circular measure electrodes, the overlap may be approximately half or more of the diameter between electrodes, or stated differently, a circumferential center to center spacing between circumferentially successive measure electrodes of preferably equal or less than about fifty percent of the diameter of circular measure electrodes.

The measure electrodes may be placed in multiple rows arranged to form a substantially closed loop. This can be particularly effective for deriving orientations of surface anomalies such as fractures or stratigraphy in the borehole wall opposite to the pad on which the electrodes are mounted. These surface anomalies, when invaded by the mud of the borehole, normally present a contrasting conductivity relative to the adjoining borehole wall. By monitoring measure electrodes in selected pairs along the loop, resistivity anomalies and their alignments can be determined with enhanced contrast relative to more homogeneous portions of the borehole wall.

In another form of a tool pad for investigating a borehole wall in accordance with the invention, an array of measure electrodes is provided in a closed loop about a center electrode. The electric potentials of an electrical current injected by the center electrode is detected by the measure electrodes in the array to provide a measurement of the distribution of the current about the center and thus obtain an indication and alignment of fractures or the stratigraphy.

It is, therefore, an object of the invention to provide an improved method and apparatus for electrically investigating a borehole wall. It is a further object of the invention to provide an improved method and apparatus for obtaining, with electrical investigatory techniques, a fine microscopic picture of borehole wall anomalies such as fractures or stratigraphy.

These and other objects and advantages of the invention can be understood from the following description of several embodiments in accordance with the invention and described in conjunction with the drawings.

DETAILED DESCRIPTION OF EMBODIMENTS

Figures 1, 2, 3, 4:
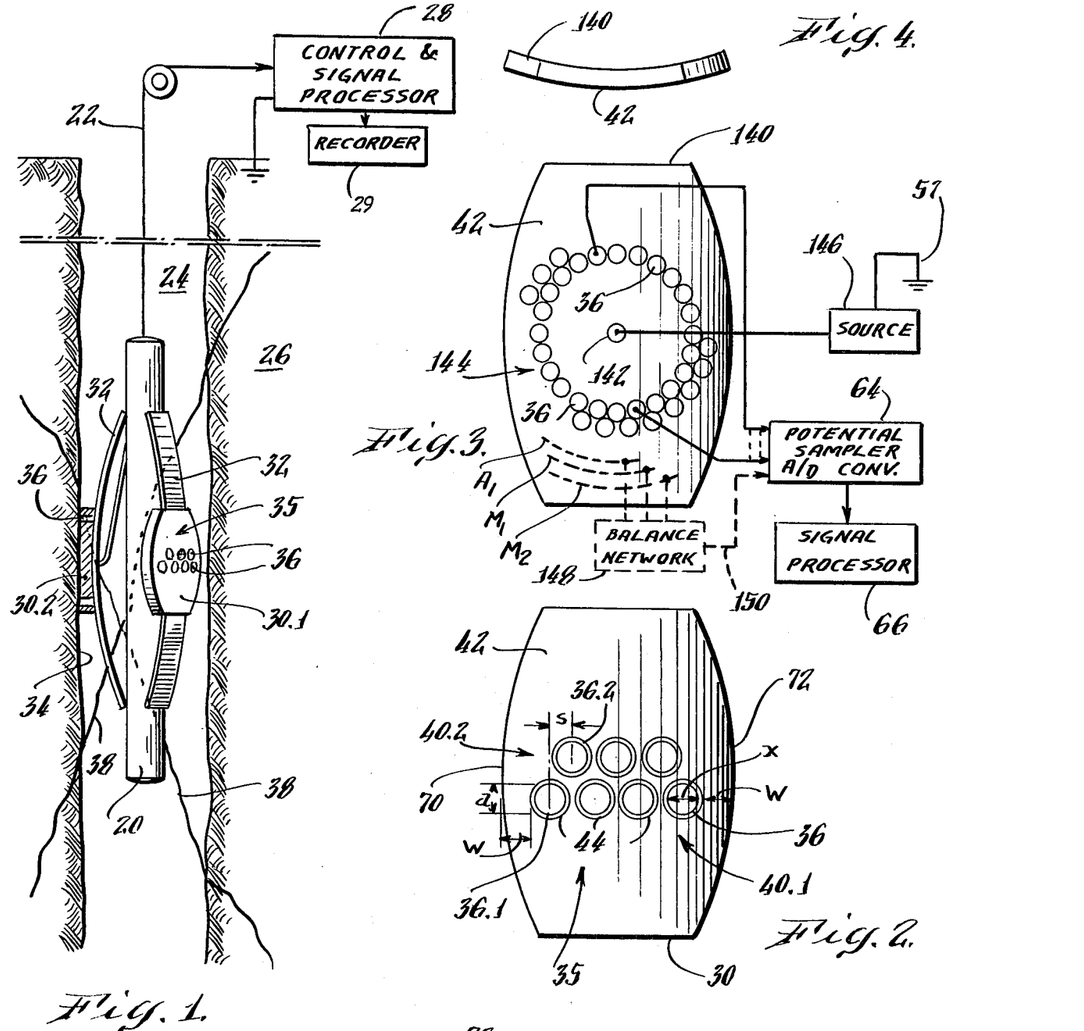
FIG. 1 is a perspective and block diagram view of a borehole investigating tool with pads in accordance with the invention.
FIG. 2 is a side elevational view of a tool pad with measure electrodes in accordance with one form of the invention.
FIG. 3 is a side elevational view of a tool pad with measure electrodes in accordance with another form of the invention.
FIG. 4 is a top plan view of the pad shown in FIG. 3.

With reference to FIG. 1, a borehole investigating tool 20 is shown suspended from a cable 22 in a borehole 24 penetrating an earth formation 26. Cable 22 is connected to a surface located control equipment 28 which includes a general purpose digital signal processor to process measurements made with a tool 20 and provide a record on recorder 29. Surface equipment 28 is further provided with appropriate controls and power to drive electrical devices in tool 20 via cable 22 in a manner as is well known in electrical borehole logging tools and techniques.

Tool 20 is provided with a plurality of pads 30 such as 30.1 and 30.2 which are mounted on devices 32 which press pads 30 against the wall 34 of borehole 24. Devices 32 may be springs or hydraulic actuators and are well known in the art so that they need not be further described.

It is desired to employ the tool 20 to make a borehole investigation by introducing electrical survey currents from an array 35 of measure electrodes 36 mounted on pad 30 into formation 26 and monitoring the magnitude of the survey currents from each survey electrode 36. A plurality of small measure electrodes 36 are used to provide a shallow depth of investigation so that the borehole wall 34 may be investigated for fracturing and stratigraphy.

As more clearly shown in FIG. 2, the measure electrodes 36 are mounted on pad 30 in a linear array 35 so that their combined effect as the tool 20 is moved along the borehole 24 is the injection of individually measurable survey currents into borehole segments which circumferentially overlap. This is obtained by locating the measure electrodes in the embodiment of FIG. 2 in separate rows 40.1 and 40.2 while locating the individual measure electrodes 36 in such a manner that the center to center spacings S between circumferentially successively electrodes such as 36.1 and 36.2 is less than their dimension as measured along a circumferential direction.

Measure electrodes 36 are mounted flush on pad 30 whose surface 42 is conductive. Measure electrodes are surrounded by insulators 44 which serve to electrically isolate measure electrodes 36 from the conductive pad surface 42 while in the operation of a pad 30 the electrical potential of the several measure electrodes 36 and conductive surface 42 is effectively the same. In the embodiment of FIG. 2 the measure electrodes 36 are shown as circular buttons, though different shapes may be employed, as for example illustrated in the aforementioned Canadian patent.

Figure 5:
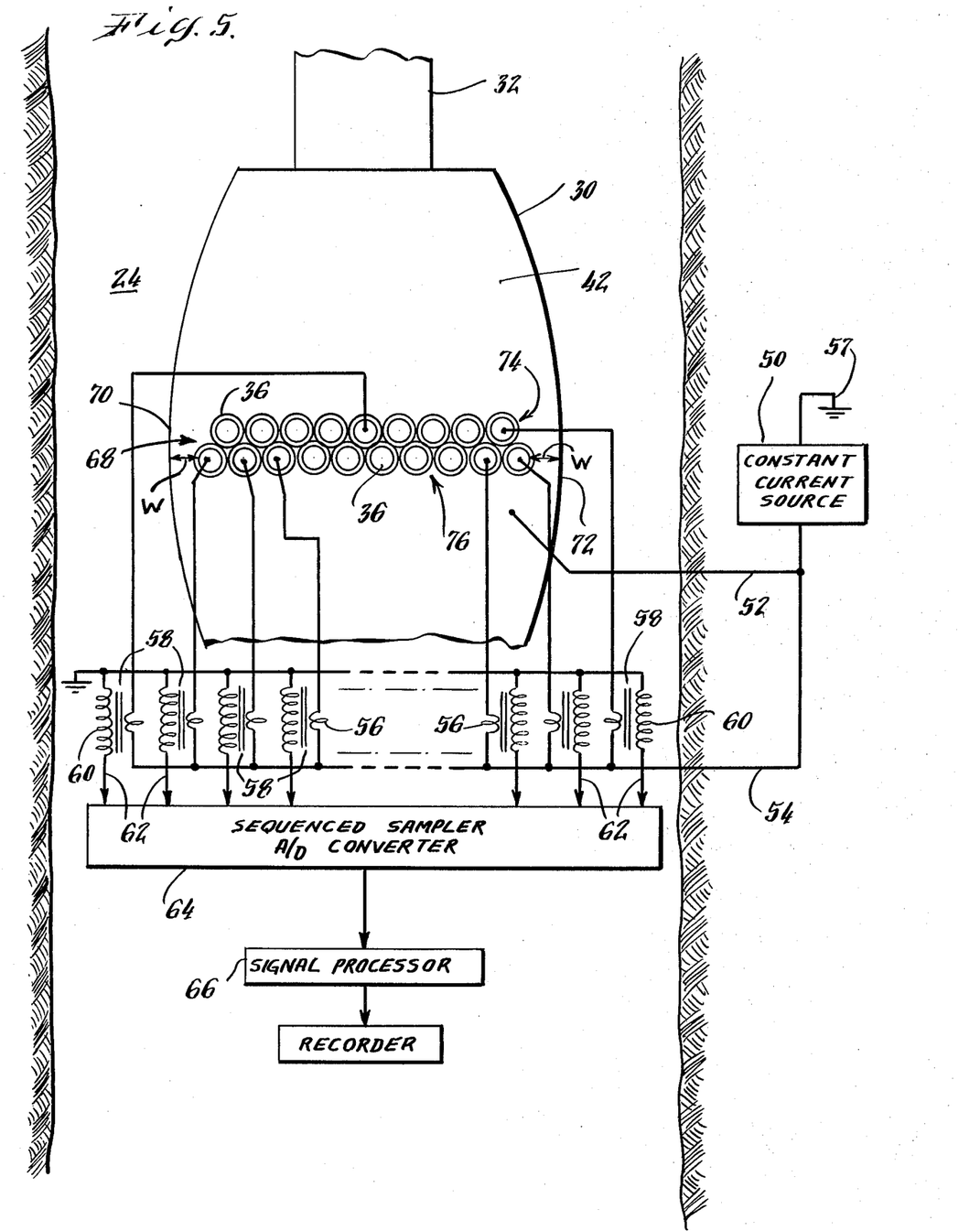
FIG. 5 is a partial side elevational view of a tool pad, block diagram and circuitry used in a tool in accordance with the invention.

Energization of the measure electrodes 36 may be with a suitable low frequency constant current source 50 as shown in FIG. 5. Source 50 provides the respective electrodes 36 and conductive pad surface 42 with current through conductors 52, 54, with the measure electrodes being supplied through effectively separate low impedance primary windings 56 of current sensing transformers 58. The measure electrodes 36 are thereby essentially at the same electrical potential as conductive pad surface 42. A return 57 is provided for the current from source 50 and may be to an electrode located near the surface or on tool 20 or on the bridle (i.e. at electrical infinity). The secondary windings 60 of transformers 58 generate a survey signal representative of the current flow from a respective measure electrode 36.

The survey signals on lines 62 from secondary windings 60 are applied to a sequenced sampling and holding device 64 which includes an analog to digital converter. Device 64 sequentially samples each survey signal on a line 62, and upon sampling automatically converts the sample to a digital form for use in a signal processor 66. Devices such as 64 are well known in the art and, therefore, need no further detailed description.

The number and size of measure electrodes 36 on any one pad 30 is selected commensurate with that needed to investigate an adequate circumferential segment of the borehole and the resolution required to detect and determine the orientation of resistivity anomalies indicative of fracturing and stratigraphy. In FIGS. 1 and 2 an array 68 of nineteen measure electrodes is employed. After being depth-shifted, however, each array generates in effect survey current over a circumferentially continuous segment, of which discrete portions are separately measureable.

The size and circumferential spacing of the measure electrodes 36 are selected in a particular manner. The spatial bandwidth of an electrode is defined by its dimensions. An accurate reproduction of the spatial distribution of the survey current density within that spatial bandwidth is determined in the circumferential direction by the spacing (the effective overlap) between electrodes, and in the axial direction by the speed of the tool 20 in the borehole and the sampling rate. The ability to reproduce accurately the survey current density using an electrode array such as array 35 or array 68 is improved as the effective overlap of the electrodes 36 is increased, although the resolution is limited by the spatial bandwidth of the individual electrodes 36.

With reference to FIG. 2, the size of the circular electrodes 36 is determinative of their respective spatial bandwidth. This means that preferably the surface area of the measure electrodes is made as small as possible to detect resistivity anomalies in any one area (spatial frequency). Too small a surface area, however, tends to increase noise levels in the sensed survey currents. Generally the surface area of the measured electrodes is selected as a tradeoff between bandwidth and noise level. The measure electrodes 36 have a single characteristic dimension, namely the diameter, d. In such case the highest spatial frequency that can be measured is approximately 1/d, i.e. at any scanning velocity, the highest spatial frequency component that can be detected is of the order of 1/d. For proper reproduction of the survey current density, sampling at a rate which is at least twice that highest spatial frequency in both axial (along the borehole) and circumferential directions is required. The measure electrodes 36 may be made with diameters, d, of about 5 mm.

For accurate reproduction the electrodes should be closely spaced. However, since the electrodes have finite dimensions they cannot be placed infinitesimally close together in the circumferential direction to meet any desired accuracy. In order to reproduce spatial frequency components lying within the current sensing "window" of each individual electrode, however, the overlap need be sufficient only to yield an array from which the spatial frequency components of the current density which are substantially within the bandwidth defined by the dimensions of each electrode itself, can be reproduced without an effect known as aliasing, i.e., when higher spatial frequencies take a disguised form of lower frequencies and become indistinguishable from the latter.

Thus, once the electrode size is selected, the center to center spacing "S" between circumferentially successive electrodes such as 36.1 and 36.2 is selected to insure that the entire array may reproduce these highest spatial frequency components.

For a correct circumferential representation of the current density or survey currents, the electrodes 36 are arranged in successive rows 40.1 and 40.2. The spacing S between centers of those measure electrodes which can be considered circumferentially successively located is preferably either equal to or less than one-half of the largest circumferential dimension, x, of a measure electrode with x being equal to d in case of a circular measure electrode 36. in the case of circular button measure electrodes as shown in FIG. 2, the relationship of $S \leq d/2$ is selected and approximated with very thin insulator rings 44.

Axial resolution is dominated by the same effects as circumferential resolution. To reproduce resistivity anomalies which lie in a plane perpendicular to the borehole axis, axial overlap is achieved by sampling the buttons of the rows 40.1 and 40.2 at a rate fast enough to insure that each is sampled at least twice the highest spatial frequency of anomalies in the axial direction. As in the selection of the circumferential location of electrodes 36, the sampling rate is selected sufficiently high to be able to reproduce the spatial frequency components which are substantially within the bandwidth defined by the dimensions of each electrode itself.

The samples of axially spaced rows 40.1 and 40.2 are depth shifted so as to obtain an accurate representation of the survey currents both as to circumferential and depth dimensions.

With an array of measure electrodes on a pad, it is desirable to investigate as much of the borehole wall as is practical. Hence, a pad 30 is provided with an array 35 whose circumferential dimension is as large as is practical. The size of a pad 30, however, cannot be too large, lest the frictional force with the borehole wall becomes so great that, when taking the effect from all of the pads 30 into account, the tool 20 becomes difficult to move along the borehole. Furthermore, the array of measure electrodes should not extend directly to an edge such as the circumferential or lateral sides 70, 72 (see FIG. 2) lest electrical end effects interfere with the resistivity measurements of nearby measure electrodes 36. Such end effects tend to cause deviation of survey currents reducing the circumferential resolution. Hence, a minimum laterally extending segment of width "W" for the conductive surface 42 is preferably maintained to prevent undue spreading of electric fields at the lateral ends of the array 35.

Figure 6:
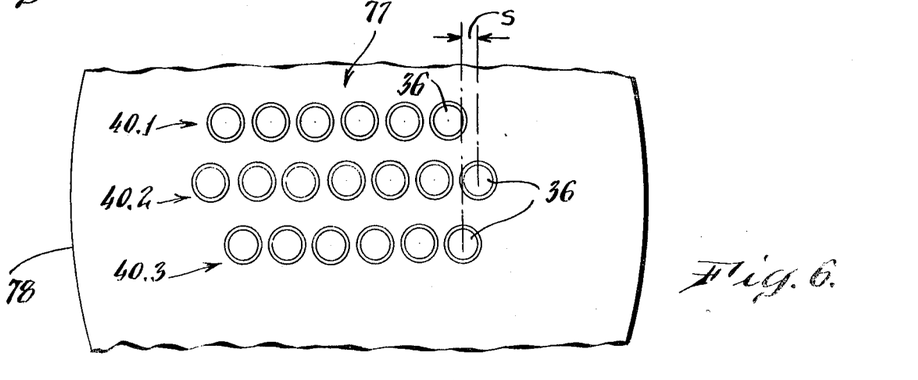
FIG. 6 is a partial side elevational view of a tool pad with an array of measure electrodes in accordance with the invention.

A practical pad 30 and array 70 (see FIG. 5) of measure electrodes 36 involves a total circumferential pad width of about 10 cm with ten circular measure electrodes, each of five mm diameter, and as closely spaced as possible in a multiple number of rows 74, 76 as shown in FIG. 5 or FIG. 6. The insulator rings 44 are made very narrow and of the order of a mm in width. The circumferential overlap between circumferentially successively located measure electrodes in different rows is made to be preferably about one-half of the largest circumferential dimension of measure electrodes 36. More than a pair of rows 74, 76 will be required in the event that one-half or greater circumferential overlap is desired to optimize the accurate reproduction of the survey current density. FIG. 6, for example, illustrates array 77 of measure electrodes 36 on a pad 78 arranged along three linear rows 40.1–40.3, each having 13 electrodes. The spacings S between circumferentially successively located electrodes is small enough to obtain a circumferential overlap of at least 50% of the diameter of the circular electrodes 36. At least three rows 40 are needed when the thickness of the insulator rings 44 is taken into account. A practical pad 78 and array 77 involves a total circumferential pad width of about 14 cm, with the center-to-center spacing between adjacent electrodes within each row being about 3d/2. Additional rows 40 of measure electrodes can be included, for example, when redundancy in the measurements is desired.

With an array of measure electrodes as described with reference to FIGS. 2, 5 and 6, information useful in detecting and determining the orientation of resistivity anomalies indicative of fracturing and statigraphy can be obtained. Useable information can be obtained from fractures having a thickness on the order of one-tenth the diameter of a circular survey electrode. The orientation is referenced to a reference plane which may be the plane which is perpendicular to the borehole axis. The smallest fractures detectable with measure electrodes 36 depends not only upon their dimensions, but also upon the resistivity contrast between the fluid filled fractures and the earth formation.

Figure 7:
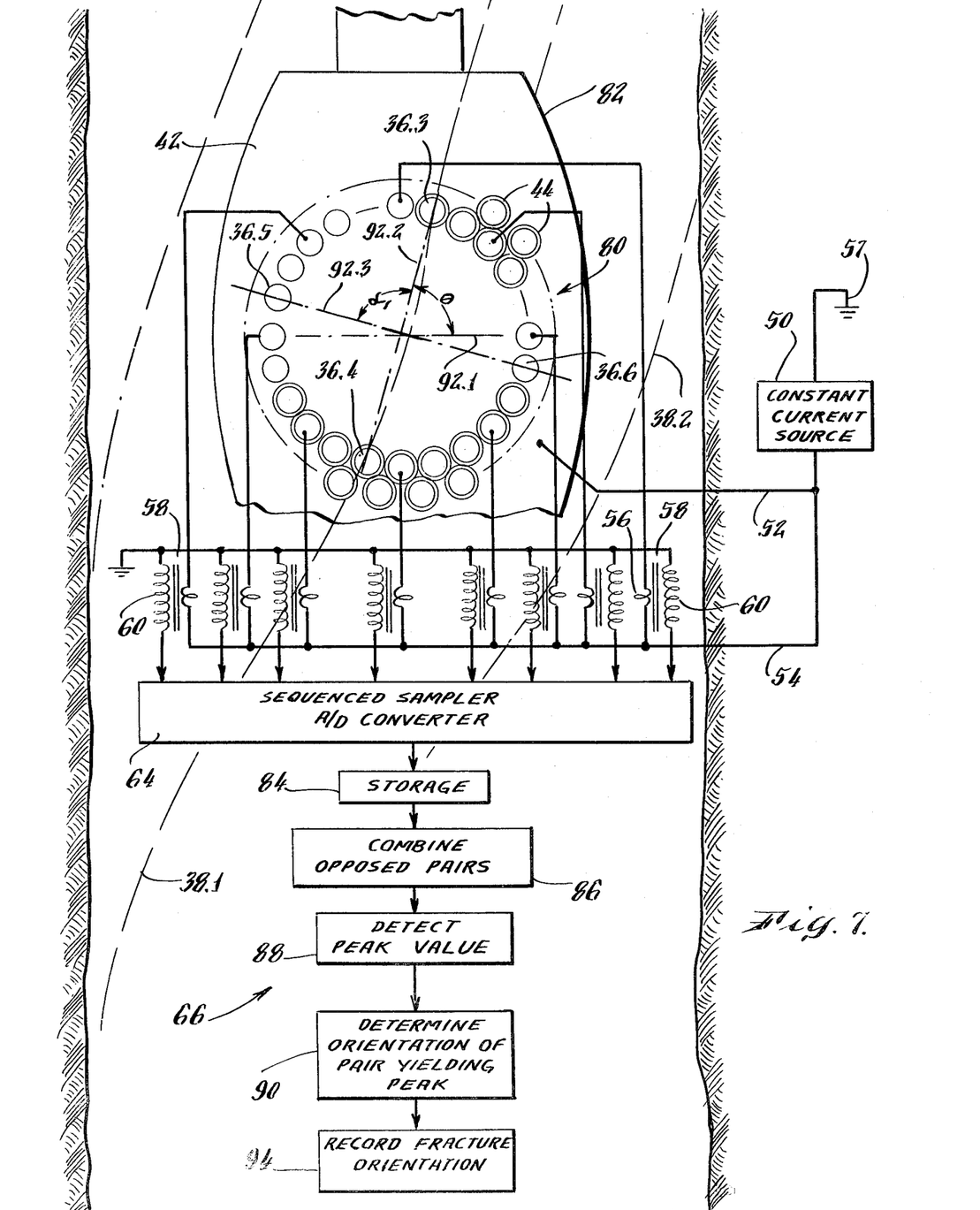
FIG. 7 is a partial side elevational view of a tool pad, block diagram and circuitry used in a tool in accordance with the invention.

In the embodiment illustrated in FIG. 7, an array 80 of measure electrodes 36 is shown arranged on a pad 82 in a loop such as a circle. The loop array is formed around a center from which along any one direction a measure electrode 36 would be intersected. Pad 82 has a conductive surface 42 in which measure electrodes 36 are embedded with their respective surfaces flush with surface 42. The measure electrodes 36 are shown surrounded by insulators 44 as described with reference to FIGS. 2 and 5.

Similar electrical energization is with a constant current source 50, survey current sensing transformers 58 and sequenced sampler and A/D converter 64 as previously described.

With a closed loop array such as 80, the alignment orientation of fractures such as 38.1 and 38.2 may be determined over a wide range of angles by scanning the survey currents sensed with transformers 58. Thus with one technique in accordance with the invention, the contrasting resistivity presented by a fracture such as 38.1 can be detected by sequentially monitoring the survey currents from the electrodes 36. When one survey electrode crosses a fracture, the sensed current rises abruptly even though the total average current from source 50 is kept nearly constant. To reduce the response that arises from a homogeneous formation where there are no fractures, the survey signals stored at 84 in signal processor 66 and representative of currents from diametrically opposite pairs of measure electrodes, such as 36.3 and 36.4 in array 80 are combined at 86. Such combining step preferably involves forming the average between survey signals from diametrically opposite measure electrodes such as 36.3 and 36.4. Successive combinations in effect define survey lines of known orientations. By scanning successive combinations at 88, a peak value can be determined representative of a fracture underlying both measure electrodes in a pair.

Since the pair of measure electrodes which yielded the peak combined value is known, the orientation of the pair relative to a reference plane, such as transverse to the total borehole axis is determined at 90, and the relative orientation or alignment angle $\theta$ of the fracture relative to line 92.1 can be recorded at 94.

Figure 8:
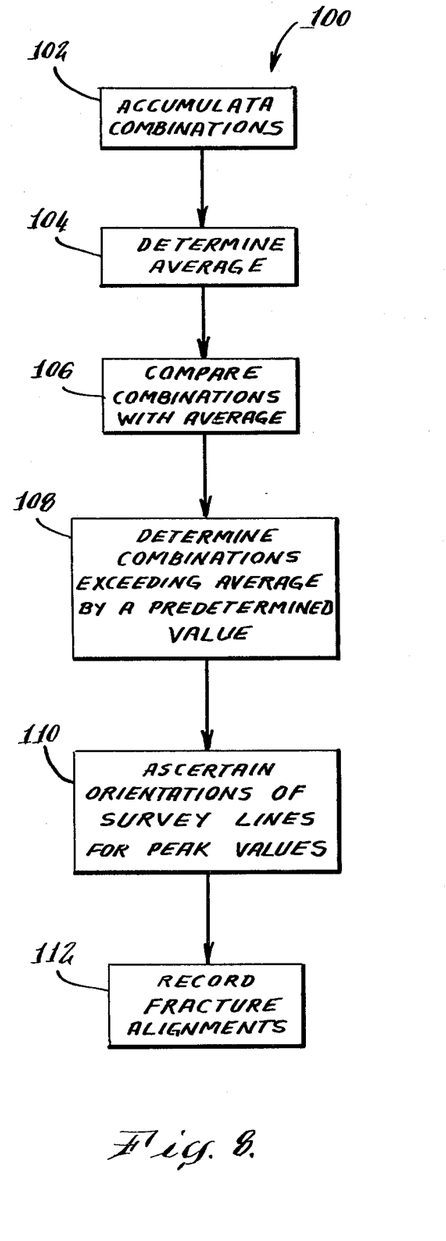
FIGS. 8 and 9 are block diagrams for a signal processor used in deriving alignment information with a tool shown in FIG. 7.

Enhancement techniques for such fracture detection and alignment determination may be employed. For example as illustrated in FIG. 8, a technique 100 is shown whereby the combined survey signals along respective survey lines of the array 80 in FIG. 7 are, after storage in signal processor 66 (see FIG. 7), averaged for a particular time or over a complete scan of the closed loop with the average then used to detect extreme values, such as a peak or minimum representative of a fracture.

The technique 100 commences at 102 by accumulating a predetermined number of survey signals at 102 and then obtaining an average value at 104. The accumulation may be done for all of the pairs of combined survey signals along survey lines encompassing a single full closed array 80 or only for a portion or over a particular time.

The average may be constantly updated to maintain a running average. This average is then used at 106 to compare with combined survey signals, so that at 108 a determination can be made as to what combination exceeds or drops below the average by a particular value such as a predetermined percentage or fixed amount. Such condition may occur for a minimum peak or a maximum peak value depending upon whether the survey signals represent conductivity or resistivity. In either case a peak value represents a fracture whose orientation can be determined at 110 and the appropriate fracture alignments may then be recorded at 112 on a visual record or in signal processor storage for subsequent visual presentation or analysis.

In a further refinement of the embodiment for FIG. 7, the measure electrodes are also successively investigated for a peak value along a contrasting survey line which crosses the survey line as to which a fracture was detected. For example, with reference to FIG. 7, when a fracture is straddled by a pair of measure electrodes 36.3 and 36.4 along a survey line 92.2, a low resistivity value is measured from the sampled survey currents. However, as to a pair of measure electrodes such as 36.5 and 36.6 whose survey line 92.3 crosses survey 92.2 at a particular angle $\alpha$, the resistivity is likely to be at a contrasting high peak value. When the crossing angle $\alpha$ is at about 90°, then the contrasting resistivity measurement along a survey line represents a confirmation of the presence of fracture 38.1.

Figure 9:
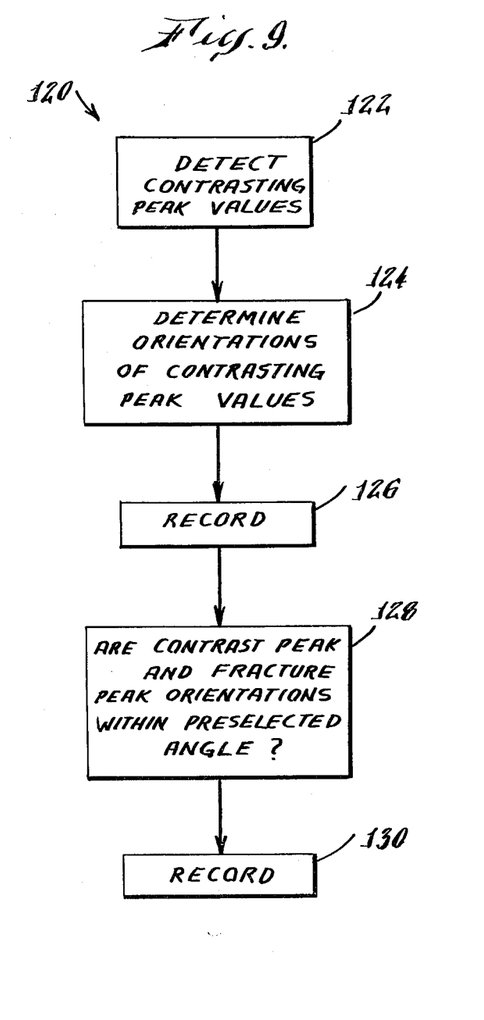

FIG. 9 provides a technique 120 for confirming the measured fracture alignment obtained with the technique of FIG. 7. At 122 the pair combinations formed at step 86 in FIG. 7 are scanned to determine the pair which yields a value of highest contrast with the peak determined at 88 in FIG. 7. This means if the latter peak represents a maximum value, then the contrasting peak is a minimum value and vice versa.

At 124 the orientation of the survey line 92 for the survey electrodes which yielded this contrasting peak is determined and recorded at 126. When the contrasting peak orientation is found at 128 to lie within a predetermined angular range of the orientation of the peak as determined at 90 in FIG. 7, this can be recorded at 130 as a positive confirmation of the fracture alignment determination at 112. The angular range is a range for values of the crossing angle $\alpha$ and may, for example, be $80° < \alpha < 100°$.

Although in the described preferred embodiments for the pads 30 a conductive pad is used, i.e. where the exposed surface 42 is conductive, it may be advantageous to employ an insulating pad. In the latter case, the measure electrodes 36 are connected with a constant current source and are mounted on an insulated pad without a focusing electrode. A conductive pad is preferred, however, since it tends to be less sensitive to tilting or lift-off of the pad 30 relative to the borehole wall.

In another form of the invention using an insulating pad as shown in FIGS. 3 and 4, a pad 140 is formed whose borehole contacting surface 42 is insulated. Pad 140 has a centrally located electrode 142 surrounded by a closed loop array 144 of slightly spaced measure electrodes 36 which overlap each other in a manner as previously described with respect to the linear rows shown in FIG. 2, but as viewed along the loop of the array 144. The array 144 is in a circular form though different patterns such as elliptical, square or rectangular may be employed. A current source 146 of low frequency alternating current is connected between central electrode 142 and a return electrode 57. The latter may be the armor of cable 22 or at some other remote location.

A sequenced sampler and analog to digital converter device, such as 64, is employed to sense the electric potential difference between measure electrodes 36 and the remotely located return electrode 57 and provide survey signals representative thereof to signal processor 66. The electric potential also may be measured relative to a reference electrode other than the return electrode 57.

Normally when opposite a homogeneous borehole wall, the equal potential lines from the central electrode 142 will be along circles concentric with central electrode 142. When the pad 140 crosses a fracture, its different normally higher conductivity distorts the symmetry of the equipotential lines. In such case the measure electrodes 36 overlying a fracture would provide a common peak excursion, which is detected using a technique as previously described. An enhanced detection of a fracture may be obtained by identifying the pairs of measure electrodes yielding the maximum and minimum survey signals for respective approximate orthogonal alignments.

The insulating pad apparatus of FIG. 3 may also be employed with dynamically focused electrodes. This can be obtained with the addition of electrodes surrounding array 144 such as the partially illustrated $A_1$, $M_1$, and $M_2$ electrodes as described in the patent to Bricaud, U.S. Pat. No. 2,750,557, or Doll, U.S. Pat. No. 2,712,629. Appropriate balancing electronics 148 are then used to control the focusing. A ground connection 150, such as obtained from the $M_1$ electrode, may be applied to network 64 to enable it to sample and compare the various potentials of measure electrodes 36 with respect to the $M_1$ electrode. The signal processor 66 may then be employed to detect potential distortions caused by formation cracks underlying the pad 140.

Having thus described several techniques for detecting borehole wall anomalies using electrical investigatory methods and devices in accordance with the invention, its advantages can be appreciated. Variations from the described techniques may be made without departing from the scope of the invention such as using a constant power source instead of the constant current source 50.

What is claimed is:

1. An apparatus for use with a borehole investigating tool having electrode carrying pads for investigating the wall of a borehole penetrating an earth formation by moving the tool along the borehole axis, comprising:

a pad adapted to be pressed against the borehole wall, said pad carrying a plurality of measure electrodes facing the borehole wall, said electrodes being electrically connected to a source of electrical energy so as to inject respectively individually measurable survey currents into the borehole wall to measure resistivity anomalies including those whose spatial frequency is of the order of a characteristic dimension of the measure electrodes, said measure electrodes being closely arranged in an array on the pad at intervals which are selected to space the measure electrodes along circumferential and borehole axis directions, the spacing of said measure electrodes within the array along the borehole axis direction being made so that survey current measurements can be made with circumferential overlap, and with the circumferential spacing of said measure electrodes including a circumferentially effective overlap of measure electrodes along their characteristic dimension, said overlap being of a predetermined amount which is at least sufficient to measure resistivity anomalies occurring at said spatial frequency with substantially reduced aliasing when said survey currents are injected from said measure electrodes into borehole segments whereby, when said tool is operatively moved along the borehole axis a circumferentially continuous area of said borehole wall is investigated with said individually measurable survey currents from respective measure electrodes.

2. The apparatus as claimed in claim 1 wherein said array of measure electrodes is formed of at least first and second spaced apart rows of measure electrodes with said measure electrodes being sized and spaced along said rows to provide said circumferentially effective overlap to a predetermined extent while establishing said substantially spatially continuous flow of current composed of individually measurable survey currents from the rows of measure electrodes.

3. The apparatus as claimed in claim 1 wherein circumferentially successive measure electrodes have a center to center spacing so as to circumferentially overlap to an extent which is at least about equal to or greater than one-half the dimension of said measure electrodes along said circumferential direction.

4. The apparatus as claimed in claims 1, 2, or 3 wherein said measure electrodes are arranged along linear rows.

5. The apparatus as claimed in claim 4 wherein said measure electrodes are arranged in at least three linear rows.

6. The apparatus as claimed in claims 1, 2, or 3 wherein said measure electrodes are arranged in concentric circular rows.

7. The apparatus as claimed in claims 1, 2 or 3 wherein said pad has a conductive surface and said measure electrodes are embedded in said pad surface, and thin insulators surrounding said measure electrodes, said measure electrodes and conductive surface being electrically connected to have the same potential.

8. An apparatus for use with a borehole investigating tool having electrode carrying pads for investigating the wall of a borehole penetrating an earth formation by moving the tool along the borehole axis, the improvement comprising:
   a pad adapted to be pressed against the borehole wall, said pad carrying a plurality of measure electrodes mounted on the pad to face the borehole wall and being connected to a source of electrical energy in such manner that respective individually measurable survey currents are injected from respective electrodes into the borehole wall, said measure electrodes being distributed on said pad in an array around a center, with said measure electrodes being so sized and spaced from each other that a measure electrode is intersected along substantially all directions from the center of the array enabling the detection and determination of the orientation of resistivity anomalies indicative of fractures in the earth formation in said borehole wall opposite said array of measure electrodes by measuring said individually measurable survey currents.

9. The apparatus as claimed in claim 8 wherein the measure electrodes are distributed in an array with overlap between measure electrodes as measured along a loop around said center.

10. The apparatus as claimed in claims 8 or 9 wherein the measure electrodes are distributed in a circle around said center.

11. The apparatus as claimed in claims 8 or 9 wherein the measure electrodes are distributed along at least first and second concentric circular rows around said center.

12. The apparatus as claimed in claims 8 or 9 and further including:
   means for generating survey signals respectively representative of the magnitude of survey currents from individual ones of said measure electrodes; and
   means for comparing survey signals from successive pairs of measure electrodes around the center wherein the measure electrodes in each pair are located at predetermined locations with respect to said center and generating comparison signals representative thereof.

13. The apparatus as claimed in claim 12 wherein measure electrodes in each of said pairs are located at generally opposite sides of said center.

14. The apparatus as claimed in claim 13 wherein said measure electrodes are distributed in a circle around said center and electrodes in said pairs are located at generally diametrally opposite positions with respect to said center.

15. The apparatus as claimed in claim 12 wherein said comparing means includes:
   means for sampling said survey signals and generating digital values representative thereof;
   means for comparing stored digital values representative of survey currents from said pairs of measure electrodes.

16. A borehole investigating tool having electrode carrying pads for investigating the wall of a borehole penetrating an earth formation by moving the tool along the borehole axis, comprising:
   a pad connected to the tool and adapted to be pressed against the borehole wall, said pad carrying a plurality of measure electrodes located to face the borehole wall and from which measure electrodes survey currents are injected into the borehole wall, said measure electrodes being distributed on said pad in a continuous array arranged in a loop on said pad, said measure electrodes being further connected to a source of electrical energy;
   means for generating survey signals respectively representative of the magnitude of survey currents from said measure electrodes;
   means for comparing survey signals from successive pairs of measure electrodes around the loop, wherein measure electrodes in each pair are located at predetermined locations along said loop and generating difference signals representative thereof;
   means for comparing difference signals respectively from survey electrode pairs which are located along survey lines which cross each other to generate contrast signals for the detection of fine resistivity anomalies in general alignment with one of said survey lines.

17. The borehole investigating tool as claimed in claim 16 wherein said array of measure electrodes is arranged in a circle on said pad.

18. The borehole investigating tool as claimed in claim 16 or 17 wherein said means for comparing said survey signal means further comprises:
   means for sampling said survey signals and generating digital values representative of the magnitude of said sampled survey signals;
   means for storing said digital values for carrying out said comparing means.

19. A method for investigating the earth formation penetrated by a borehole with an electrical current generating tool which is moved along the borehole axis comprising the steps of:
   injecting from a pad of the tool as it is moved along the borehole spatially an array of discrete electrical survey currents into the earth formation at the wall of the borehole wherein the survey currents have cross-sections selected to enable detection of fine resistivity anomalies and wherein the spacings between discrete survey currents are so selected that the combined borehole surface area injected by said survey currents extends over a continuous circumferential portion of the borehole wall as the tool is moved along the borehole and with a predetermined circumferential overlap sufficient to measure resistivity anomalies whose spatial frequency is of the order of a characteristic dimension of the discrete survey currents; and measuring the magnitudes of the discrete survey currents so as to enable detection of resistivity anomalies indicative of fracturing and stratigraphy in the earth formation segments in which the survey currents are injected.

20. The borehole investigation method as claimed in claim 19 wherein the step of injecting said discrete survey currents further comprises circumferentially spacing said survey currents so as to establish a predetermined circumferential overlap of borehole wall areas injected with survey currents as the tool is moved along the borehole.

21. The borehole investigation method as claimed in claim 20 wherein said circumferential spacings of the survey currents during their injection into the borehole wall are selected to provide a said overlap of about equal to or greater than one-half of the dimension of said discrete survey currents along the circumferential direction.

22. The borehole investigating method as claimed in claims 19, 20, or 21 wherein said step of injecting said survey currents further comprises:
injecting into said earth formation a first plurality of discrete survey currents spaced in a first row at predetermined circumferential intervals from ech other; and
injecting into said earth formation a second plurality of discrete survey currents arranged in a second row, said second plurality of survey currents being displaced in the borehole axis direction from the first plurality of survey currents and being so circumferentially displaced therefrom to inject, in combination with the first plurality of survey currents, said circumferentially continuous portion of said earth formation with discrete survey currents.

23. The borehole investigation method as claimed in claim 22 wherein said step of injecting said survey currents further includes:
injecting into said earth formation at least a third plurality of discrete survey currents in a third row with spacings selected so that said plurality of rows of discrete survey currents provide said overlap to an extent of at least equal or greater than one half of the circumferential dimensions of said discrete survey currents.

24. The borehole investigating method as claimed in claim 22 wherein said first and second rows of discrete survey currents are injected to lie parallel to each other and to a plane which is transverse to the borehole axis.

25. The borehole investigating method as claimed in claim 22 wherein said step for injecting said survey currents comprises injecting said discrete survey currents in rows which are curved around a common center and provide in combination a spatially continuous closed loop injection of survey current into said earth formation.

26. The borehole investigating method as claimed in claim 25 wherein said discrete survey currents are injected along concentric circularly shaped loops.

27. The borehole investigating method as claimed in claim 25 and further comprising:
comparing the magnitude of survey current measurements for predetermined pairs of said discrete survey currents flows to detect in said earth formation segments fine resistivity anomalies which bear a characteristic alignment with a line drawn between a pair of discrete survey currents.

28. The borehole investigating method as claimed in claim 27 wherein said comparing step further comprises:
combining survey current measurements obtained from pairs of discrete survey currents wherein a line drawn between any one pair crosses the line for another pair with a predetermined angle which is selected to obtain contrasting resistivity indications when a resistivity anomaly is in alignment with one of said pairs of discrete survey currents.

29. The borehole investigating method as claimed in claim 28 wherein said predetermined angle is of the order of about 90°.

30. An apparatus for use with a borehole investigating tool having electrode carrying pads for investigating the wall of a borehole penetrating an earth formation by moving the tool along the borehole axis, comprising:
a pad adapted to be pressed against the borehole wall, said pad carrying a plurality of individually operative measure electrodes facing the borehole wall, said measure electrodes being arranged on the pad in an array at locations selected to individually measure spatially discrete portions of an electrical signal injected into the formation from said pad at a place surrounded by said array of measure electrodes, said array of measure electrodes being arranged in the form of a loop with multiple rows of measure electrodes which, as viewed in a direction along the loop, sufficiently overlap so that a measure electrode is intersected in substantially all directions from the place where said electrical signal is injected and means for producing survey signals respectively corresponding to measured discrete portions of said electrical signal and representative of a spatial distribution of said electrical signal around its place of injection.

31. The apparatus as claimed in claim 30 wherein said array of measure electrodes is arranged about a center; and
wherein a center located electrode is provided for injecting said electrical signal into the formation.

32. The Apparatus as claimed in claims 30 or 31 wherein said array is arranged in a circular loop.

33. The borehole investigating as claimed in claim 30 and further comprising:
means for sensing potentials of said measure electrodes; and
means for comparing said sensed potentials to detect disturbances of the electrical potential generated by the injection of the survey current.

34. The borehole investigating tool as claimed in claim 33 wherein said potential sensing means senses the potential between predetermined pairs of measure electrodes.

35. The borehole investigating tool as claimed in claim 33 wherein said potential sensing means senses the potential between the measure electrodes and a reference electrode located on the tool.

36. An apparatus adapted to be connected to a borehole tool for investigating the resistivity of earth formations penetrated by a borehole, comprising:
   a pad adapted to be urged against the wall of a borehole, said pad including an array of physically separate electrodes for electrical communication with the wall of the borehole, said array of electrodes being spread along a selected survey direction over a distance which is greater than the dimension of a said electrode along said selected survey pattern, said array including electrodes each of which effectively partially overlaps on each of opposite sides at least one other of said electrodes in the array as determined along said selected survey direction so that said overlap between said electrodes extends throughout said array along the selected survey direction.

37. An apparatus as in claim 36 wherein said effective partial overlap comprises at least fifty percent of said dimension of said electrode.

38. An apparatus as in claim 37 wherein said electrodes are of uniform shape and size.

39. An apparatus as in claim 36 or 37 wherein a nominal circumferential direction and a nominal axial direction are identifiable for said pad, said pad being adapted to be urged against the wall of the borehole; and wherein said array comprises a plurality of rows of electrodes, each of said rows being arranged along the nominal circumferential direction and wherein each electrode of each row effectively partially overlaps at least one other electrode of another row, the selected survey pattern being a circumferential line segment.

40. An apparatus as in claim 39 wherein said pad has a conducting portion; and wherein said electrodes are current electrodes and are mounted in said conducting portion, said electrodes being electrically insulated therefrom and at the same potential as said conducting portion.

41. An apparatus as in claim 40 wherein said array is located a predetermined distance from the edge of the conducting portion of said pad to prevent undue spreading of electrical fields at the edge of said array.

42. An apparatus as in claim 36 or 38 wherein said array comprises a plurality of concentric closed patterns of electrodes, each electrode of each closed pattern effectively overlapping at least one other electrode of another closed pattern along said selected survey pattern.

43. An apparatus as in claim 42 wherein said concentric closed patterns are concentric circular rows and said selected survey pattern is a circle.

44. An apparatus as in claim 43 wherein said pad has a conducting portion; and wherein said electrodes are current electrodes and are mounted in said conducting portion, said electrodes being electrically insulated therefrom and at the same potential as said conducting portion.

45. An apparatus as in claim 44 wherein said array is located a predetermined distance from the edge of said conducting portion to prevent undue spreading of electrical fields at the edge of said array.

46. An apparatus as in claim 43 and further comprising a central current electrode on said pad; said pad having an insulator portion; and wherein said electrodes of said array are voltage measuring electrodes and are mounted in said insulator portion.

47. An apparatus for obtaining resistivity anomalies indicative of fracturing and/or stratigraphy of earth formations penetrated by a borehole, comprising:
   a tool body;
   a conducting pad adapted to be urged against the wall of the borehole, a nominal circumferential direction and a nominal axial direction therefor being identifiable for said pad, said pad including an array comprising a plurality of rows of electrodes, each of said rows being arranged along the nominal circumferential dimension, wherein:
   said electrodes are adapted for electrical communication with the wall of the borehole, said electrodes being current electrodes mounted in said conducting pad while being electrically insulated therefrom, and at the same potential as said conducting pad;
   said electrodes being physically separate from one another with inner electrodes of each row effectively partially overlapping on each of opposite sides along the nominal circumferential direction at least one other electrode of another row as viewed along the nominal axial dimension; and with the overlap of said electrodes extending throughout said array;
   means coupling said pad to said tool body for urging said pad against the wall of the borehole;
   means for providing survey current to said electrodes; and
   means for measuring survey current emitted by each of said electrodes.

48. An apparatus as in claim 47 wherein said electrodes are uniformly circular with a predetermined diameter, and wherein said effective partial overlap comprises at least fifty percent of said diameter as viewed along the nominal axial direction.

49. An apparatus as in claim 48 wherein said array is located a predetermined distance from the edge of said pad to prevent undue spreading of electrical fields at the edge of said array.

50. A wall-engaging apparatus for use in measuring a characteristic of earth formations traversed by a borehole, comprising:
   a base member having a face adapted for engaging the wall of said borehole; and
   a plurality of measure electrodes supported by said base member at said wall-engaging face for injecting respectively individually measurable survey currents into said formations, said measure electrodes having a characteristic spatial bandwidth and being arranged in an array with circumferential displacements between effectively circumferentially adjacent measure electrodes being selected for accurate reproduction of the spatial distribution of the survey current density substantially to the accuracy of said spatial bandwidth and with axial displacements between effectively circumferentially adjacent measure electrodes being selected for physically accommodating said measure electrodes at said wall-engaging face.

51. A method for measuring a characteristic of earth formations traversed by a borehole, comprising the steps of:
   injecting a first individually measurable focused survey current into said formation at a first point along a characteristic dimension for measuring said characteristic with a selected spatial bandwidth;

injecting a second individually measurable focused survey current into said formation at a second point along said characteristic dimension for measuring said characteristic with said selected spatial bandwidth;

the displacement between said first point and said second point being selected for accurate reproduction of the spatial distribution of the survey current density substantially to the accuracy of said spatial bandwidth; and producing a tangible representation of said characteristic in accordance with measurements of said first and second survey currents.

* * * * *